United States Patent
Miyata et al.

(10) Patent No.: US 6,339,726 B1
(45) Date of Patent: Jan. 15, 2002

(54) CONTROL APPARATUS FOR VENDING MACHINE

(75) Inventors: Yasuhiko Miyata; Toshitake Maruyama, both of Saitama-ken; Yasuhiro Yamazaki, Gunma-ken; Seiji Ebukuro; Masayuki Ootani, both of Saitama-ken, all of (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 0 days.

(21) Appl. No.: 09/236,963

(22) Filed: Jan. 25, 1999

(51) Int. Cl.[7] .......................... G06F 17/00; G05B 19/18
(52) U.S. Cl. .......................... 700/3; 700/231
(58) Field of Search .......................... 700/3, 9, 19, 20, 700/23, 231–233

(56) References Cited

U.S. PATENT DOCUMENTS

| | | | |
|---|---|---|---|
| 4,328,539 A | 5/1982 | Heeger | 364/144 |
| 4,598,379 A | 7/1986 | Awane et al. | 364/479 |
| 5,793,629 A * | 8/1998 | Ishida et al. | 364/131 |
| 5,980,078 A * | 9/1999 | Krivoshein et al. | 364/131 |

FOREIGN PATENT DOCUMENTS

| | | |
|---|---|---|
| GB | 2 209 080 A | 4/1989 |
| JP | 0 927 0059 | 10/1997 |

* cited by examiner

*Primary Examiner*—William Grant
*Assistant Examiner*—Elliot Frank
(74) *Attorney, Agent, or Firm*—Scully, Scott, Murphy & Presser

(57) ABSTRACT

A control apparatus for vending machine free from necessity of replacing the main control program when a new function is to be supplemented to the sub-control units in the control apparatus or when an additional sub-control unit is to be added thereto, thus reducing the costs and labor. The apparatus comprising a main control unit operated by a main control program stored in a main control memory having vacant space, sub-control units controlled by the main control unit, the main control program includes data specifically set for each sub-control unit.

3 Claims, 3 Drawing Sheets

CONTROL APPARATUS FOR VENDING MACHINE

FIELD OF THE INVENTION

This invention relates to a control apparatus for a vending machine, and more particularly to a control apparatus for a vending machine having a main control unit and sub-control units to which a new function can be incorporated or a new sub control unit can be added with reduced costs.

BACKGROUND OF THE INVENTION

A vending machine is controlled by a control apparatus consisting of a main control unit and some sub-control units. Sub-control units include a sales control unit for controlling the article-handling system, a display control unit for controlling displays, display lamps, article-selecting buttons and so on, and a money handling unit in the vending machine. Main control unit controls these sub-control units generally.

FIG. 1 shows an example of conventional vending machine. Main control unit 101 which controls sub-control units 102A to 102D is operated by main control program $P_M$ stored in main control memory 111. Specific main control programs $P_{MA}$ to $P_{MD}$ specified for sub-control units 102A to 102D, respectively, are incorporated in main control program $P_M$ in order to control sub-control units 102A to 102D.

There are various kinds of vending machine, for example, one for serving 20 kinds of available articles and another for serving 30 kinds. Data $D_A$ to $D_D$ for setting column number, relay number, number of selection buttons, etc. are held in main control unit 101 as a part of main control program $P_M$ according to the type of vending machines, in order to control the vending machine in accordance with the number of kinds of available articles.

When, for example, a type of machine for serving 30 kinds of articles has to be developed following that for serving 20 kinds of articles, replacement of main control memory 111 which is a FROM for storing data $D_A$ to $D_D$ set for controlling the sub-control units is required. To cope with this problem, a control apparatus for vending machine as explained below is proposed in Japanese Patent Application Laid Open No.Hei9-128604.

FIG. 2 shows another example of conventional control apparatus for a vending machine. Setting data specified to each part of the vending machine are held in each sub-control unit controlling the respective part. Main control unit 201 receives set data $D_A$ to $D_D$ from respective sub-control units 202A to 202D to control the vending machine. Main control program $P_M$ includes specific main control programs $P_{MA}$ to $P_{MD}$ specified to sub-control units 202A to 202D, respectively, to control respective sub-control units. Thereby, only changing of the sub-control units that concern the required change in the machine is required in place of replacing main control memory 211 which is a ROM.

When a new function is to be supplemented to the sub-control units in these conventional control aparatuses for vending machine, a new main control program has to be created so as to involve the new function because a conventional main control program does not involve any portion available to deal with the new function, whereby a serious problem is caused.

For example, when a power-saving function is to be supplemented to the sales control units in the conventional control apparatus for a vending machine, a process or processes to save power have to be added not only to the control program of the sales control unit, one of the sub-control units, but also to the portion of main program specified to the sales control unit. The power-saving processes, such as a process to put out the fluorescent lamps at a predetermined time and a process to prolong the interval of operation of the refrigerator for cooling the articles, have to be added to the control program of the sales control unit. The power-saving processes, such as a process to determine whether power for the fluorescent lamps should be saved or not and a process to determine at what temperature or below in the environment the power for the refrigerator should be saved, have to be added to the portion of main program specified to the sales control unit. Therefore, not only the control program for the sales control unit, one of the sub-control units, but also the control program for the main control unit must be renewed to add the power-saving processes, resulting in replacement of the ROM for storing the latter program.

SUMMARY OF THE INVENTION

Accordingly, it is an object of the invention to provide a control apparatus for a vending machine free from the necessity of replacing the main program when a new function is to be supplemented to the sub-control units in the control apparatus, removing the necessity of replacing parts and software in the main control unit, whereby costs and labor can be reduced.

It is another object of the invention to provide a control apparatus for a vending machine free from the necessity of replacing the main program when another sub-control unit is to be added to the sub-control units in the control apparatus, removing the necessity of replacing parts and software in the main control unit, whereby costs and labor can be reduced.

According to the first feature of the invention, a control apparatus for a vending machine comprises:

a main control unit operated by a main control program, at least a part of the main control program being stored in the main control unit; and sub-control units controlled generally by the main control unit;

the main control program including data specifically set for each of the sub-control units; wherein:

the data specifically set for a particular sub-control unit are stored in the particular sub-control unit; and a part of the main control program for controlling specifically the particular sub-control unit is stored in the particular sub-control unit.

According to the second feature of the invention, a control apparatus for a vending machine comprises:

a main control unit operated by a main control program, a first part of the main control program being stored in the main control unit; and sub-control units controlled generally by the main control unit;

the main control program including data specifically set for each of the sub-control units; wherein:

the data specifically set for a particular sub-control unit are stored in the particular sub-control unit;

a second part of the main control program for controlling specifically the particular sub-control unit is stored in the particular sub-control unit; and the second part of the main control program is supplemented to the first part of the main control program stored in the main control unit by loading the main control unit with the second part when the particular sub-control unit is connected with the main control unit.

According to the second feature of the invention, once the sub-control unit is connected to the main control unit, the part of main control program stored in the particular sub-control unit is incorporated into the main control program stored in the main control unit, thereby control can be executed in the same manner as the case where the part of main control program is stored therein from the start.

BRIEF DESCRIPTION OF THE DRAWINGS

The invention will be described in more detail in conjunction with the accompanying drawings, wherein.

PREFERRED EMBODIMENTS OF THE INVENTION

Preferred embodiments of the invention will be described in detail with reference to FIG. 3 and FIG. 4.

Figure 1:
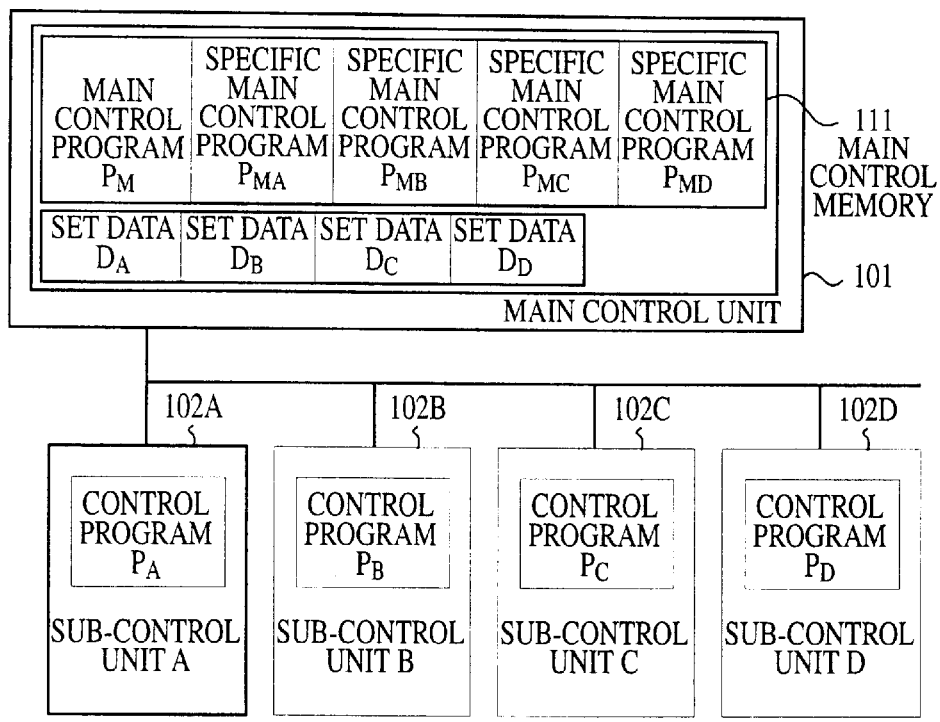
FIG. 1 is a block diagram of a conventional control apparatus for vending machine.
Figure 2:
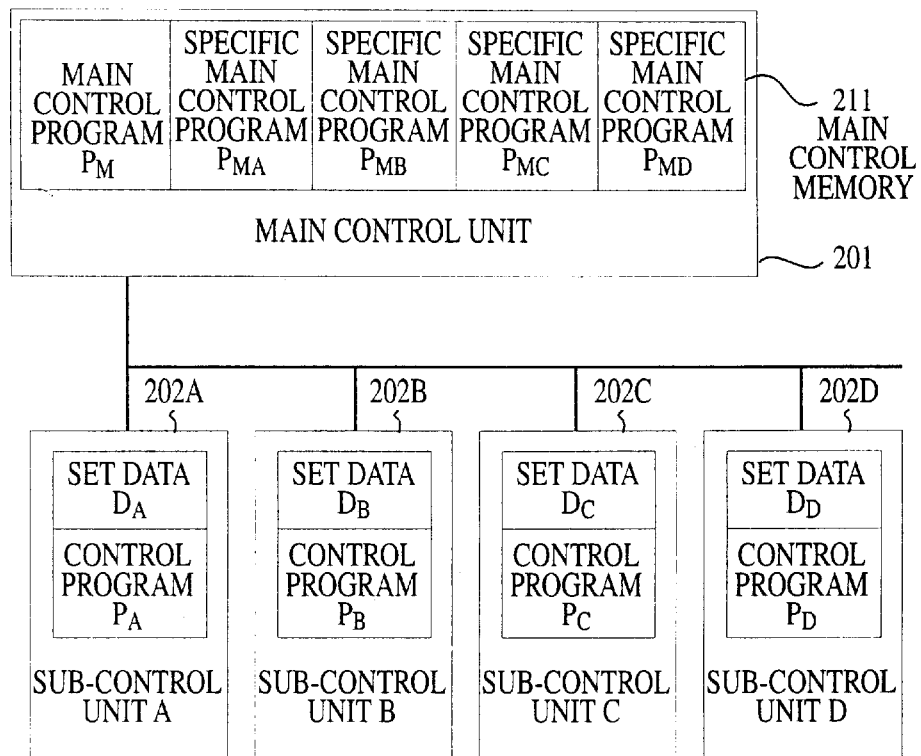
FIG. 2 is a blocks diagram of a conventional control apparatus for vending machine.
Figure 3:
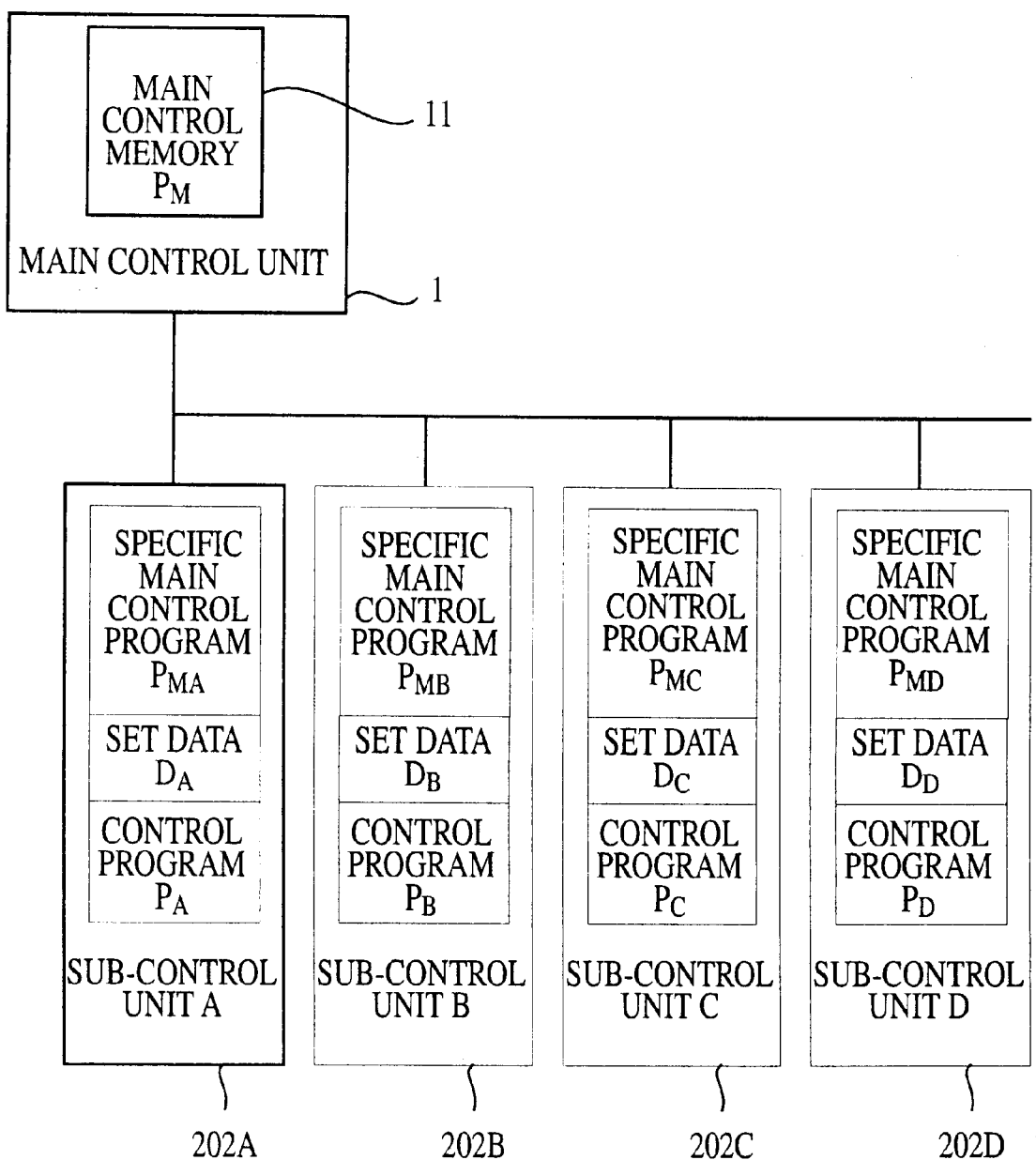
FIG. 3 is a block, diagram of a preferred embodiment of control apparatus for vending machine according to the invention.

FIG. 3 shows a control apparatus for a vending machine in a preferred embodiment of the invention. The control apparatus consists of main control unit 1 and sub-control units 2A, 2B, 2C and 2D. Main control program $P_M$ is stored in main control unit 1. Specific main control program $P_{MA}$ specified to sub-control unit 2A. set data $D_A$ and sub-control program $P_A$ are stored in sub-control unit 2A. Similarly, specific main control programs $P_{MB}$, $P_{MC}$ and $P_{MD}$ specified to sub-control units 2B, 2C and 2D, respectively, set data $D_B$, $D_C$ and $D_D$, and sub-control programs $P_B$, $P_C$ and $P_D$ are stored in sub-control units 2B, 2C and 2D, respectively.

The main control program for the control apparatus is composed of main control program $P_M$ and specific main control programs $P_{MA}$, $P_{MB}$, $P_{MC}$ and $P_{MD}$. Specific main control programs $P_{MA}$, $P_{MB}$, $P_{MC}$ and $P_{MD}$ specified to sub-control units 2A, 2B, 2C and 2D, respectively, are stored in the respective sub-control units.

Set data $D_A$ $D_B$, $D_C$ and $D_D$ used for the main control program, specific respectively to sub-control units 2A, 2B, 2C and 2D, are stored in the respective sub-control units 2A, 2B, 2C and 2D. Set data $D_A$ $D_B$, $D_C$ and $D_D$ are transferred from sub-control units 2A, 2B, 2C and 2D, respectively, to main control unit 1 when these data are to be utilized in main control unit 1.

Figure 4A:
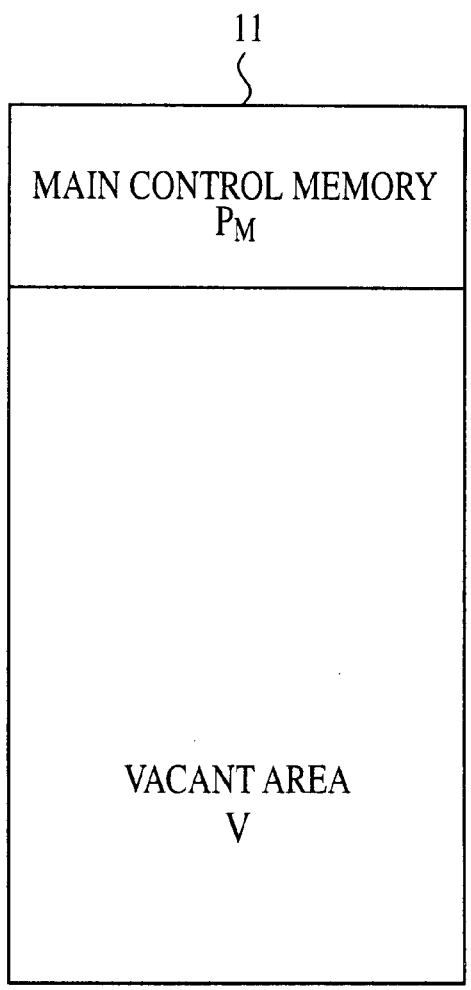
FIG. 4A is an explanatory view showing a content of memory stored in the main control unit according to the invention in the earlier stage.
Figure 4B:
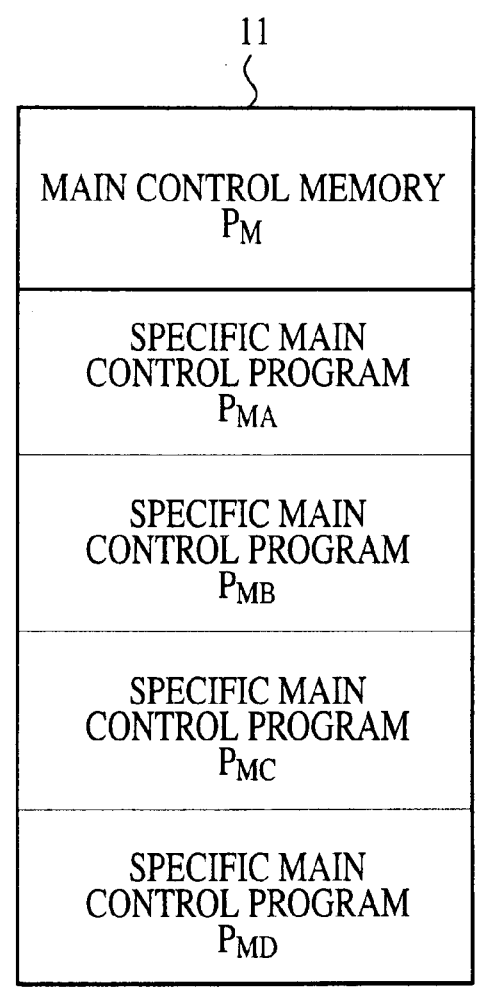
FIG. 4B is an explanatory view showing a content of memory stored in the main control unit according to the invention in the later stage.

FIG. 4A and FIG. 4B show the contents of information stored in main control memory 11 in main control unit 1. FIG. 4A shows the content of information stored in main control memory 11 in main control unit 1 before sub-control units 2A, 2B, 2C and 2D are connected with main control unit 1. Only main control program $P_M$ for controlling main control unit 1 is stored in main control memory 11. Main control memory 11 has vacant area V in the remainder.

FIG. 4B shows the content of information stored in main control memory 11 in main control unit 1 after sub-control units 2A, 2B, 2C and 2D are connected with main control unit 1. Upon connection of sub-control units 2A, 2B, 2C and 2D with main control unit 1, specific main control programs $P_{MA}$, $P_{MB}$, $P_{MC}$ and $P_{MD}$ are transferred from sub-control units 2A, 2B, 2C and 2D, respectively, to vacant area V of main control memory 11, so as to be stored therein. Thereby, main control memory 11 is occupied by main control program $P_M$ and specific main control pro-rams $P_{MA}$, $P_{MB}$, $P_{MC}$ and $P_{MD}$. The control of vending machine is ready to start.

A RAM or a flash memory may be used as main control memory 11. If a flash memory is used for main control memory 11, divided areas should be assigned for storing to specific main control programs $P_{MA}$, $P_{ME}$, $P_{MC}$, and $P_{MD}$ respectively. Main control memory 11 may be loaded with specific main control programs $P_{MA}$, $P_{ME}$, $P_{MC}$, and $P_{MD}$ when power is supplied to the vending machine not only when sub-control units 2A, 2B, 2C and 2D are connected with main control unit 1, but also when a switch in the vending machine is operated, when a key on the key board in the control unit of the vending machine is operated or when a key on the key board in a personal computer attached to the vending machine is operated. It is favorable, however, that main control memory 11 is loaded with specific main control programs $P_{MA}$ to $P_{MD}$ when sub-control units 2A to 2D are connected with main control unit 1, as in the preferred embodiment, because the loading is accomplished without any key operation.

In a control apparatus for vending machine according to the first feature of the invention, the data specifically set for a particular sub-control unit are stored therein and a part of the main control program for controlling specifically the particular sub-control unit also is stored therein, eliminating the necessity to replace the main control program when a new function is supplemented to a sub-control program or when an additional sub-control unit is to be provided, thereby, the costs in such occasion can be reduced significantly.

In a control apparatus for vending machine according to the second feature of the invention, a part of the main control program for specifically controlling a particular sub-control unit is stored therein, and this part of the main control program is incorporated into the basic main control program stored in the main control unit, by loading the main control unit with the part of main control program stored in the particular sub-control unit, in response to connection of the latter unit with the main control unit when a new function is to be added to a particular sub-control program or when the control unit is to be provided with an additional sub-control unit. The costs in such occasion can be reduced significantly because replacement of the main control program is not necessary.

Although the invention has been described with respect to the specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. A control apparatus for a vending machine, comprising:
   a main control unit operated by a main control program,
   a first part of said main control program being stored in said main control unit in a main control memory; and
   sub-control units controlled by said main control unit;
   said main control program including data specifically set for each of said sub-control units; wherein:

said data specifically set for a particular sub-control unit are stored in said particular sub-control unit; and a second part of said main control program for controlling specifically said particular sub-control unit is stored in said particular sub-control unit leaving vacant space in the main control memory.

2. A control apparatus for a vending machine, comprising:

a main control unit operated by a main control program, a first part of said main control program being stored in said main control unit; and sub-control units controlled by said main control unit;

said main control program including data specifically set for each of said sub-control units; wherein:

said data specifically set for a particular sub-control unit are stored in said particular sub-control unit;

a second part of said main control program for controlling specifically said particular sub-control unit is stored in said particular sub-control unit; and said second part of said main control program is supplemented to said first part of said main control program stored in said main control unit by loading said main control unit with said second part when said particular sub-control unit is connected with said main control unit.

3. The control apparatus for a vending machine as defined in claim 2, wherein:

said main control unit comprises a memory storing said first part of main control program and having a vacant area; and said second part of said main control program is transferred from said particular sub-control unit to said vacant area in said memory when said particular sub-control unit is connected with said main control unit.

* * * * *